Patented June 5, 1934

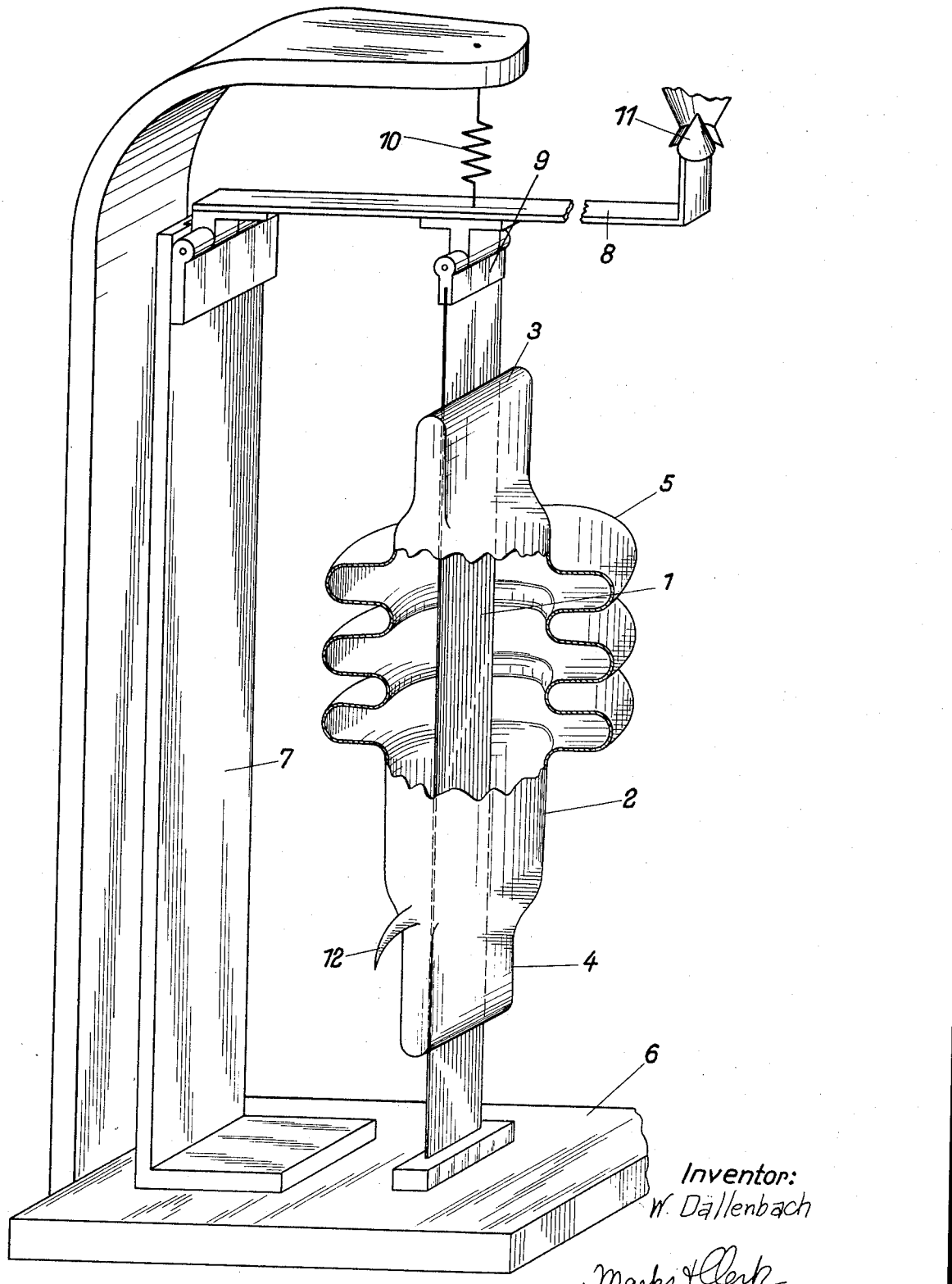

1,961,282

UNITED STATES PATENT OFFICE 1,961,282

ACTUATING DEVICE

Walter Dällenbach, Berlin-Charlottenburg, Germany

Application April 17, 1933, Serial No. 666,617
In Germany April 22, 1932

4 Claims. (Cl. 67—110)

This invention relates to a device for actuating mechanically movable parts in dependence on radiation intensity.

It is known already to cause two or more bodies, particularly two metal rods possessing great capacity of thermal expansion, such as two copper rods, one of which has a bright or highly polished surface while the other is black, to act simultaneously on a lever system in such a way that the latter will have no effect if the surrounding temperature is changed, but that it will act as soon as the radiation intensity is varied. This known effect is used, for instance, for controlling a gas valve in dependence on radiation intensity, though the main use thereof is made in connection with the so-called sun valves which serve for automatically starting gas-fed beacons at night, which are operated without attendants.

The sensitiveness of the device is evidently the greater the higher the temperature above ambient particularly of the black, heat radiation absorbing rod is as compared with the bright, heat radiation reflecting rod at a given intensity of radiation. This temperature above ambient depends partly on the degree of blackness and partly on the degree of heat transfer from the black rod. Causes of the heat transfer include radiation of heat, the drawing off of heat by the gas, especially the surrounding atmosphere, and conduction of heat by the structural parts supporting the black rod and connecting the latter with the lever system. Reduction of heat elimination due to the causes stated will correspondingly increase the sensitiveness of the device in reacting to variations in radiation intensity. The radiation of heat apparently cannot be reduced, since, owing to one of the fundamental laws of the theory of radiation, it has a fixed relation to the absorption of heat which is especially high with respect to the black rod. A favorable influence, however, will be exerted by reducing the drawing off of heat, above all, by the surrounding gas and, secondly, by the structural parts holding the black rod and connecting it with the lever system.

The object of the invention is therefore a device for actuating mechanically movable parts by radiation intensity, which contains at least one heat radiation absorbing body, especially a black body, enclosing in a vacuum vessel for the purpose of heat insulation.

A relatively poor vacuum of, for example, a few millimeters mercury column will effect already a considerable reduction in the removal of heat by gas, as no hydrodynamic flow and, therefore, no ventilation can take place any more in the gas of reduced pressure, while the heat conduction proper of the gas, which is known to be independent of pressure in case of higher pressures, will of course remain. In order to eliminate also this conduction of heat of the gas, it will be necessary to increase the vacuum to such an extent that the medium free length of path of the gas molecules is comparable to, or large relative to, the dimensions of the vacuum vessel and of the preferably black body enclosed therein and absorbing heat radiation.

In numerous instances it will be advisable to effect actuation by the expansion due to heat of a radiation absorbing black and solid body.

As stated above, a further improvement according to the invention can be made by causing the preferably black body absorbing heat radiation to be held in the vacuum vessel by means of structural elements involving only slight heat conduction towards the outside. For example, this may be effected by arranging the preferably black body absorbing the radiation of heat inside the vacuum vessel on points constituting the smallest possible contact surface for heat transmission, or the black and radiation absorbing body may be suspended inside the vacuum vessel from thin bands or wires which, owing to their small cross section, will conduct very little heat towards the outside. In the latter case it will be necessary for the radiation absorbing and preferably black body in the vacuum vessel to effect actuation by means of tractive forces which are the only forces possible in connection with the thin bands or wires serving for suspension.

If the mechanically movable parts to be actuated are outside the vacuum vessel enclosing the radiation absorbing and preferably black body, it will always be necessary for the effects of the forces coming from this body to pass through the wall of the vacuum vessel. This can be brought about, for example, by rendering certain parts of the wall of the vessel elastic, or by letting the body act through the walls of the vessel by means of magnetic fields.

The greater the heat capacity of the radiation absorbing and preferably black body arranged in the vacuum, the less will the device according to the invention respond to variations in radiation intensity. For this reason it is often desirable to keep down the heat capacity of the body. Another possibility of reducing the inertia of the device and simultaneously increasing the sensitiveness thereof is afforded by imparting to the body the greatest possible surface relative to its weight or heat capacity by employing for instance a thin metal band having a blackened surface and possessing preferably a high capacity of thermal expansion, which is enclosed in the vacuum vessel.

To prevent the device from responding exclusively to variations in radiation intensity and not to changes in the surrounding temperature, the compensation of thermal expansion owing to a change in the surrounding temperature should be applied with particular care. This is done, as a rule, by compensating the effect exerted by the radiation absorbing and preferably black body, owing to a change in the surrounding temperature, by the counter-effect of one or several bodies which, compared with the black body or bodies, will react similarly to the latter to changes in the surrounding temperature, but respond to a lesser degree to variations in radiation intensity. One application of this principle consists in using the vacuum vessel containing the radiation absorbing and preferably black body as comparison body for compensating temperature changes in the surroundings. If the vessel is made of glass and contains a black metal body, it is possible to compare the thermal expansions of the glass vessel and of the enclosed black body and to effect compensation by employing as metal body a body having the same capacity of thermal expansion as the glass.

If the device serves for opening or closing an electric contact, it will be advisable to place the contact inside the vacuum vessel containing the radiation absorbing and preferably black body in order to avoid action through the walls of the vacuum vessel.

One form of the invention is illustrated in the accompanying drawing; in which the figure is a perspective view partly broken away of the automatic valve.

1 is a metal band having a blackened surface and possessing a high capacity of thermal expansion. The band 1 is sealed at both ends and in tensioned condition into a glass vessel 2 at 3 and 4. If the band is of sufficient thinness, direct melting in can take place even if the glass and band differ in their capacity of thermal expansion. The wall of the glass vessel consists partly of a tubular spring 5 capable of yielding in axial direction. The vessel 2 is exhausted to a high vacuum at the connection 12 and sealed off. Parallel to the band 1 and into the same base plate 6 a bar 7 is fixed whose capacity of thermal expansion coincides with that of the band 1. At the top of the rod 7 a lever 8 is arranged which is engaged at 9 by the metal band 1, and a tension spring 10 arranged above and suitably supported relative to the base plate 6 serves for keeping the band 1 tensioned and for bringing the lever 8 into a position corresponding to this tensioned state of the band 1. The end of the lever 8 suitably actuates a gas stop valve 11. It is assumed in this case that at sufficient heat radiation intensity in the surroundings the band 1 will be heated and expand, and the gas valve 11 will then be closed. If the intensity of radiation in the surroundings is reduced, the band 1 will be gradually shortened and, at a certain minimum of radiation, open the valve 11 which might then feed, for instance, a signal lamp or a beacon. To prevent heating of the bar 7 owing to heat radiation, it is advisable to impart to it a highly polished surface. It is evident that instead of only two bodies, the band 1 and the bar 7, whose lengths are compared, a larger number of bodies may be used. The invention permits of a great variety of applications which are made possible by combining known constructions with the real feature of the invention, namely, the prevention of heat transmission by enclosing the heat radiation absorbing and preferably black body in a vacuum.

I claim:—

1. An automatic valve comprising a body adapted to absorb heat rays, a transparent evacuated vessel surrounding said body, a second body possessing the same coefficient of thermal expansion as said first body but absorbing the heat rays to a lesser degree and being immovably connected at one end with one end of said first body, a lever connecting the other ends of the said members, and a valve controlled by said lever.

2. An automatic valve comprising a body adapted to absorb heat rays, a transparent evacuated vessel surrounding said body, a second body possessing the same coefficient of thermal expansion as said first body but absorbing the heat rays to a lesser degree and being immovably connected at one end with one end of said first body, a lever movably connecting the other ends of the said members, a valve controlled by said lever, a rigid member, and a spring tensioning the body in said evacuated vessel and connected with said rigid member.

3. An automatic valve comprising a body adapted to absorb heat rays, a transparent evacuated vessel surrounding said body, a second body possessing the same coefficient of thermal expansion as said first body but absorbing the heat rays to a lesser degree and being immovably connected at one end with one end of said first body, a lever movably connecting the other ends of the said members, a valve controlled by said lever, a rigid member, and a spring for tensioning the body in said evacuated vessel, said spring being connected to said rigid member, and said evacuated vessel consisting of transparent corrugated glass.

4. An automatic valve comprising a body adapted to absorb heat rays, a transparent evacuated vessel surrounding said body, a second body possessing the same coefficient of thermal expansion as said first body but absorbing the heat rays to a lesser degree and being immovably connected at one end with one end of said first body, a lever movably connecting the other ends of the said members, a valve controlled by said lever, a rigid member, and a spring for tensioning the body in said evacuated vessel, said spring being connected to said rigid member and said evacuated vessel consisting of transparent corrugated glass, said body adapted to absorb the heat rays being black.

WALTER DÄLLENBACH.